United States Patent
Jo et al.

(10) Patent No.: US 12,304,453 B2
(45) Date of Patent: May 20, 2025

(54) SHIFT CONTROL METHOD FOR A HYBRID VEHICLE

(71) Applicants: HYUNDAI MOTOR COMPANY, Seoul (KR); KIA CORPORATION, Seoul (KR)

(72) Inventors: Min Gyun Jo, Ansan-si (KR); Jae Young Choi, Seoul (KR); Hoon Han, Hwaseong-si (KR); Gwang Il Du, Ansan-si (KR); Han Nah Song, Daejeon (KR); Chun Hyuk Lee, Seongnam-si (KR); Kwon Chae Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 321 days.

(21) Appl. No.: 17/875,651

(22) Filed: Jul. 28, 2022

(65) Prior Publication Data
US 2023/0146143 A1   May 11, 2023

(30) Foreign Application Priority Data
Nov. 8, 2021   (KR) .................. 10-2021-0152307

(51) Int. Cl.
*B60W 20/10*   (2016.01)
*B60W 20/30*   (2016.01)

(52) U.S. Cl.
CPC ............ *B60W 20/10* (2013.01); *B60W 20/30* (2013.01); *B60W 2540/106* (2013.01);
(Continued)

(58) Field of Classification Search
CPC ............... B60W 20/10; B60W 20/30; B60W 2540/106; B60W 2710/083;
(Continued)

(56) References Cited

U.S. PATENT DOCUMENTS 4,971,011 A * 11/1990 Nanyoshi .............. F02D 41/105
  123/492
5,334,102 A * 8/1994 Sato .................. F16H 61/66259
  474/18

(Continued)

FOREIGN PATENT DOCUMENTS

DE   102019120280 A1 * 8/2020 ............ B60W 10/06
JP      2003227385 A  * 8/2003

(Continued)

OTHER PUBLICATIONS

Translation of KR-102086178-B1 retrieved from Espacenet on Jul. 24, 2024 (Year: 2024).*

(Continued)

*Primary Examiner* — Thomas Ingram
*Assistant Examiner* — Faris Asim Shaikh
(74) *Attorney, Agent, or Firm* — Lempia Summerfield Katz LLC

(57) ABSTRACT

A shift control method for a hybrid vehicle includes: determining whether a request for a kick-down shift has been made; identifying predetermined input torque increase conditions when the kick-down shift request is made; comparing a predetermined input torque increase amount with a predetermined reference value when all of the input torque increase conditions are satisfied; and controlling a driving motor or an auxiliary motor to additionally output the input torque increase amount, based on the result of comparing the input torque increase amount with the reference value.

8 Claims, 3 Drawing Sheets

(52) U.S. Cl.
CPC .............. *B60W 2710/083* (2013.01); *B60W 2710/1005* (2013.01); *B60W 2710/105* (2013.01)

(58) Field of Classification Search
CPC ... B60W 2710/1005; B60W 2710/105; B60W 10/06; B60W 10/08; B60W 10/11; B60W 2510/0216; B60W 2510/1005; B60W 2510/244; B60W 2540/103; B60W 10/02; B60W 20/19; B60W 10/10; B60W 20/13; B60W 50/10; B60W 2510/083; B60W 2540/10; B60W 10/115; B60W 10/023; B60W 2710/08; B60W 2030/206; B60W 10/196; B60W 10/026; B60W 10/26; B60W 30/18136; B60W 20/20; B60W 2030/1809; B60W 2710/021; B60W 30/19; B60W 2520/10; B60W 2710/027; B60W 2510/0275; B60W 2510/084; B60W 2710/085; B60W 30/18; B60W 10/04; B60W 2710/1027; B60W 2510/0657; B60W 2510/0661; B60K 6/442; B60K 6/387; Y02T 10/62; Y02T 10/70; Y02T 10/7072; Y02T 10/40; Y02T 10/64; Y02T 10/72; Y02T 90/16; Y02T 90/14; B60L 58/12; B60L 2240/547; B60L 2240/423; B60L 2240/507; B60L 2240/50; B60L 2260/54; B60L 15/2045; B60L 2250/26; B60L 2250/28; B60Y 2200/92; B60Y 2300/42; B60Y 2300/43; B60Y 2300/18083; B60Y 2300/421; Y10S 903/902; Y10S 903/946; Y10S 903/914; Y10S 903/917; F16D 2500/3027; F16D 2500/1107; F16D 2500/3065; F16D 2500/30814; F16D 2500/30822; F16D 2500/30406; F16D 2500/30407; F16D 2500/30412; F16D 2500/30421; F16D 2500/30425; F16D 2500/104; F02D 41/022; F02D 41/0215; F16H 63/502; F16H 2061/0425; F16H 61/21; F16H 61/14; F16H 63/46

See application file for complete search history.

(56) References Cited

U.S. PATENT DOCUMENTS

| | | | | |
|---|---|---|---|---|
| 6,067,495 | A * | 5/2000 | Fliearman | F16H 61/0213 701/55 |
| 6,125,315 | A * | 9/2000 | Kon | F02D 41/0005 477/92 |
| 6,602,164 | B2 * | 8/2003 | Yoshiaki | B60W 30/19 477/6 |
| 8,874,334 | B2 | 10/2014 | Jeon et al. | |
| 10,974,714 | B2 * | 4/2021 | Johri | B60W 10/08 |
| 2003/0162617 | A1 * | 8/2003 | Minagawa | B60L 50/61 903/910 |
| 2006/0080020 | A1 * | 4/2006 | Iriyama | F02D 41/023 477/111 |
| 2007/0225115 | A1 * | 9/2007 | Nakajima | B60W 30/19 477/107 |
| 2009/0160379 | A1 * | 6/2009 | Doerr | B60W 20/10 318/400.15 |
| 2009/0248268 | A1 * | 10/2009 | Shigeta | B60K 23/0808 701/72 |
| 2009/0291803 | A1 * | 11/2009 | Moeller | F02B 39/10 477/110 |
| 2009/0326778 | A1 * | 12/2009 | Soliman | B60K 6/442 701/84 |
| 2011/0009237 | A1 * | 1/2011 | Kim | F16H 61/0437 903/945 |
| 2011/0106388 | A1 * | 5/2011 | Boeckenhoff | B60W 10/06 701/70 |
| 2012/0029743 | A1 * | 2/2012 | Jeon | B60W 10/11 903/902 |
| 2013/0073136 | A1 * | 3/2013 | Yamamoto | B60W 30/188 180/65.23 |
| 2013/0103282 | A1 * | 4/2013 | Oh | B60W 10/06 701/84 |
| 2013/0178330 | A1 * | 7/2013 | Nefcy | F16D 48/06 477/174 |
| 2014/0048026 | A1 * | 2/2014 | Miyazato | F02D 13/0238 123/90.15 |
| 2014/0148986 | A1 * | 5/2014 | Yoshikawa | B60W 20/10 903/930 |
| 2015/0088348 | A1 * | 3/2015 | Lee | B60W 20/40 180/65.265 |
| 2015/0127231 | A1 * | 5/2015 | Maurer | F16H 61/04 701/55 |
| 2015/0183424 | A1 * | 7/2015 | Kim | B60W 10/11 180/65.265 |
| 2016/0084375 | A1 * | 3/2016 | Yoon | F16H 61/0213 701/55 |
| 2016/0214503 | A1 * | 7/2016 | Orita | B60L 50/66 |
| 2016/0244043 | A1 * | 8/2016 | Nefcy | B60W 10/115 |
| 2017/0015321 | A1 * | 1/2017 | Nakadori | B60W 30/16 |
| 2017/0074186 | A1 * | 3/2017 | Shin | B60W 10/06 |
| 2017/0334281 | A1 * | 11/2017 | Iwamitsu | B60L 15/2054 |
| 2018/0093657 | A1 * | 4/2018 | Pietron | B60W 10/023 |
| 2018/0118191 | A1 * | 5/2018 | Park | B60W 10/08 |
| 2018/0148064 | A1 * | 5/2018 | Goto | B60K 6/445 |
| 2018/0162367 | A1 * | 6/2018 | Oh | B60W 40/00 |
| 2018/0229734 | A1 * | 8/2018 | Tsukamoto | F16H 63/502 |
| 2018/0319397 | A1 * | 11/2018 | Ohta | B60W 30/143 |
| 2019/0061737 | A1 * | 2/2019 | Goto | B60W 30/18072 |
| 2019/0184810 | A1 * | 6/2019 | Yun | B60K 6/387 |
| 2019/0234471 | A1 * | 8/2019 | Yoshino | F16D 11/14 |
| 2020/0039500 | A1 * | 2/2020 | Lim | B60W 20/15 |
| 2020/0180628 | A1 * | 6/2020 | Choi | B60W 20/40 |
| 2020/0248802 | A1 * | 8/2020 | Kitagawa | B60W 10/10 |
| 2021/0387530 | A1 * | 12/2021 | Oh | F16H 61/0213 |
| 2022/0135341 | A1 * | 5/2022 | Takahashi | B65G 47/24 414/784 |

FOREIGN PATENT DOCUMENTS

| | | |
|---|---|---|
| KR | 20120011620 A | 2/2012 |
| KR | 102086178 B1 * | 3/2020 |

OTHER PUBLICATIONS

Translation of JP-2003227385-A retrieved from Espacenet on Jul. 24, 2024 (Year: 2024).*

Translation of DE-102019120280-A1 retrieved from Espacenet on Jul. 24, 2024 (Year: 2024).*

* cited by examiner

SHIFT CONTROL METHOD FOR A HYBRID VEHICLE

CROSS-REFERENCE TO RELATED APPLICATION

This application claims priority to and the benefits of Korean Patent Application No. 10-2021-0152307, filed on Nov. 8, 2021, the disclosure of which is herein incorporated by reference in its entirety.

BACKGROUND

1. Field

The present disclosure relates to a technology regarding a shift control for a vehicle including a hybrid powertrain.

2. Description of the Related Art

A hybrid vehicle has both an engine and a motor mounted thereto, and may improve the fuel efficiency of the vehicle by combining power of the engine and power of the motor according to the driving situation of the vehicle.

The hybrid vehicle may be equipped with a motor configured to be mainly responsible for a driving force of the vehicle (Hereinafter, referred to as "driving motor") and a first auxiliary motor such as a hybrid starter generator (HSG) configured to be mainly responsible for engine starting and power generation.

The first auxiliary motor may be driven while being connected to the engine, and thus it is possible to partially support the driving force of the vehicle by the power of the first auxiliary motor.

Further, the first auxiliary motor may be mainly connected to the engine through a power transmission device such as a belt. However, the hybrid vehicle may exclude the above-described configuration, and may be equipped with a second auxiliary motor which is directly mounted to the output shaft of the engine. The second auxiliary motor is mainly responsible for engine starting and power generation, and can support the driving motor.

For reference, hereinafter, the first auxiliary motor and the second auxiliary motor together will be called "auxiliary motor".

When a driver depresses an accelerator pedal at a predetermined level or higher, a kick-down shift is performed. The kick-down shift is a technology of performing a shift from a current shift stage to a lower shift stage having a shift ratio greater than that of the current shift stage to increase torque of driving wheels and thereby improve the feeling of acceleration of a vehicle.

The above descriptions regarding background technologies have been made only to help understanding of the background of the present disclosure and may not constitute prior art.

SUMMARY OF THE PRESENT DISCLOSURE

The present disclosure provides a shift control method for a hybrid vehicle. In particular, a vehicle output torque corresponding to a driver's demand can be provided more sufficiently at the time of shifting of the hybrid vehicle, thereby further improving the acceleration performance of the vehicle and, ultimately, substantially improving the merchantability of the vehicle.

In accordance with an aspect of the present disclosure, a shift control method for a hybrid vehicle may include: determining whether a request for a kick-down shift has been made; identifying predetermined input torque increase conditions when the kick-down shift request is made; comparing a predetermined input torque increase amount with a predetermined reference value when all of the input torque increase conditions are satisfied; and controlling a driving motor or an auxiliary motor to additionally output the input torque increase amount, based on the result of comparing the input torque increase amount with the reference value.

It may be determined that the input torque increase conditions are satisfied when: the state of charge (SOC) of a high-voltage battery installed in the vehicle is equal to or greater than a predetermined reference SOC, and allowable power of the high-voltage battery is equal to or greater than predetermined reference power; driver demand torque calculated based on the amount of accelerator pedal manipulation by a driver is less than predetermined maximum torque; and an engine clutch is in an engaged state within a predetermined slip rate.

The input torque increase conditions may be further satisfied when a combination of a current shift stage and a target shift stage corresponds to a predetermined shift combination.

The input torque increase amount may be calculated as the difference between driver demand torque and vehicle output torque.

The reference value may be determined based on allowable surplus torque of the driving motor.

When the input torque increase amount is equal to or less than the reference value, the input torque increase amount may be output by the driving motor.

When the input torque increase amount is greater than the reference value, the input torque increase amount may be output by the auxiliary motor.

The driver demand torque may be calculated based on the amount of accelerator pedal manipulation by the driver. The vehicle output torque may be calculated by summing output torque of the engine, output torque of the driving motor, and output torque of the auxiliary motor.

The controlling of the driving motor or the auxiliary motor to output the input torque increase amount may be repeatedly performed while updating the input torque increase amount when the amount of accelerator pedal manipulation by the driver is equal to or greater than a predetermined reference manipulation amount and when a shift progress rate is less than a predetermined reference progress rate.

The present disclosure can more sufficiently provide vehicle output torque corresponding to a driver's demand at the time of shifting of a hybrid vehicle, thereby further improving the acceleration performance of the vehicle and, ultimately, substantially improving the merchantability of the vehicle.

BRIEF DESCRIPTION OF THE DRAWINGS

The above and other aspects, features and advantages of the present disclosure should be more apparent from the following detailed description taken in conjunction with the accompanying drawings, in which.

Figure 1:
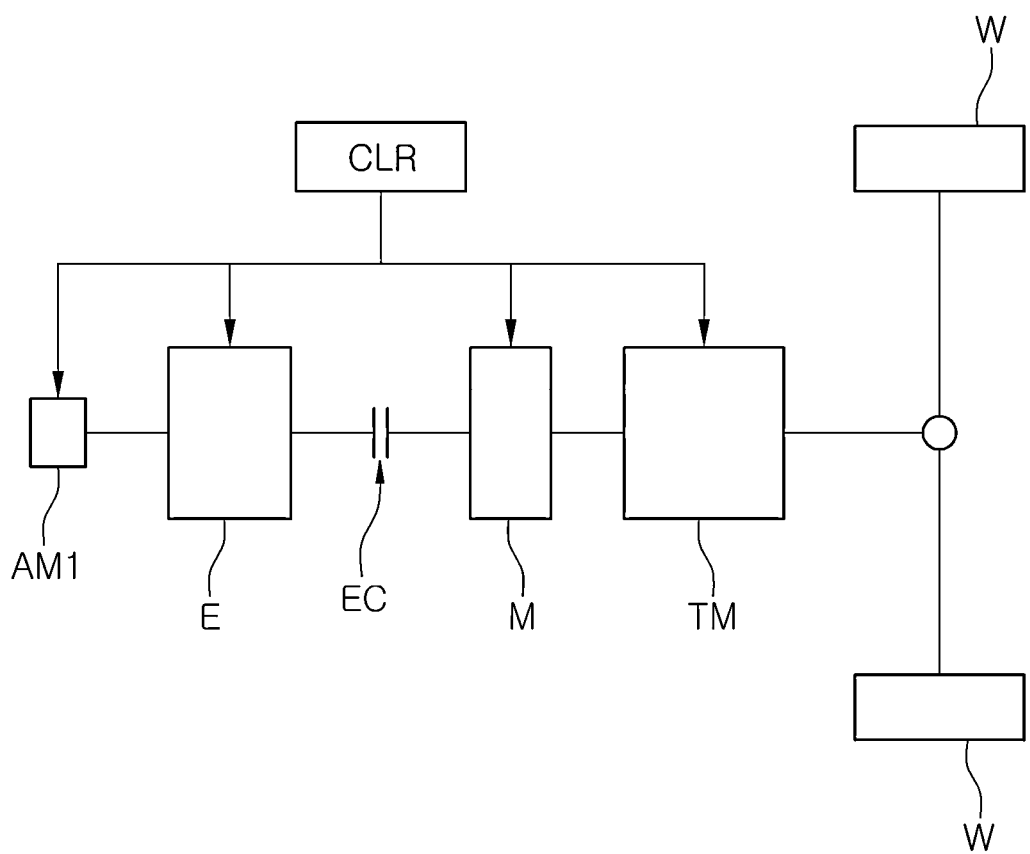
FIG. 1 illustrates a hybrid powertrain including a first auxiliary motor to which the present disclosure may be applied.

The drawings described herein are for illustration purposes only and are not intended to limit the scope of the present disclosure in any way.

DETAILED DESCRIPTION

A specific structural or functional description of embodiments of the present disclosure is given merely for the purpose of describing the embodiment according to the present disclosure. Therefore, the embodiments according to the present disclosure may be implemented in various forms, and the present disclosure should not be construed as being limited to the embodiments described in the present disclosure.

Various changes and modifications may be made to the embodiments according to the present disclosure, and therefore particular embodiments are illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure are described in detail with reference to the accompanying drawings. In the respective drawings, identical or like reference signs denote identical or like components.

FIG. 1 illustrates a hybrid powertrain including a first auxiliary motor to which the present disclosure may be applied. An engine E may be connected to the first auxiliary motor AM1 by a belt or the like, and thus may be started by the first auxiliary motor AM1. The first auxiliary motor AM1 may generate power by a driving force of the engine E.

The engine E is connected to a driving motor M and a transmission TM through an engine clutch EC, and the driving motor M is directly coupled to an input shaft of a transmission TM for a direct power transfer therebetween.

Therefore, power of the first auxiliary motor AM1 may be supplied to the input shaft of transmission TM through the engine E and the engine clutch EC.

The power having passed through the transmission TM is distributed both driving wheels W through a differential so as to drive a vehicle.

Figure 2:
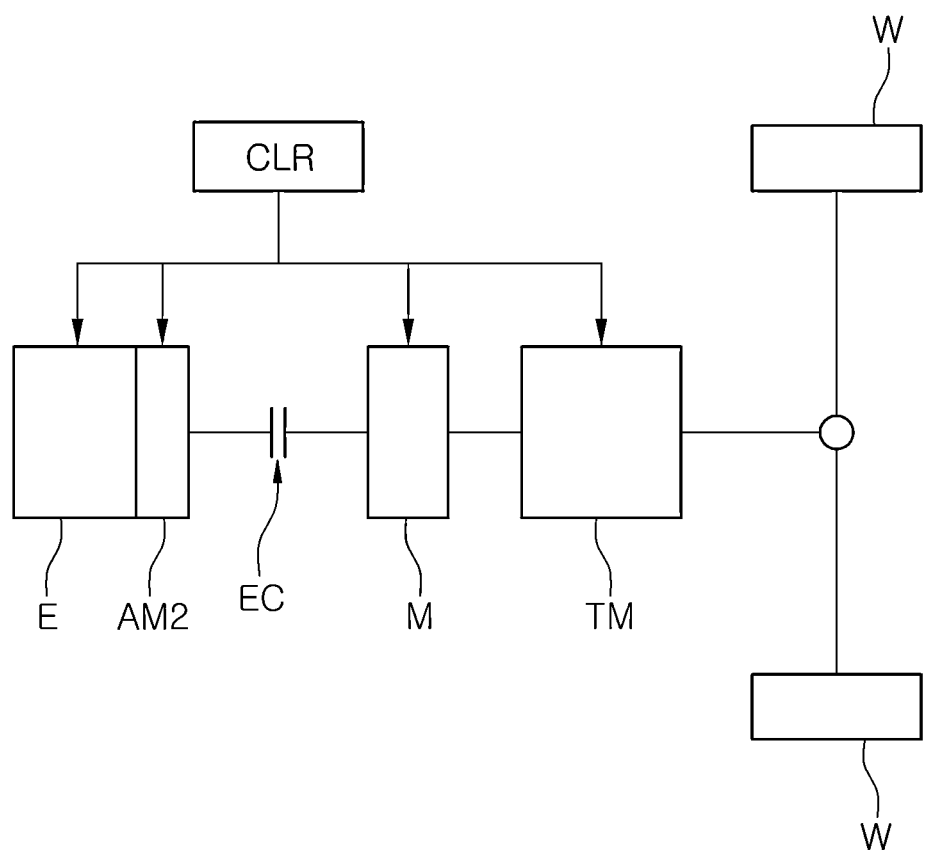
FIG. 2 illustrates a hybrid powertrain including a second auxiliary motor to which the present disclosure may be applied.

FIG. 2 illustrates a hybrid powertrain including a second auxiliary motor to which the present disclosure may be applied. As illustrated in FIG. 2, the second auxiliary motor AM2 is directly mounted to the output shaft of an engine E, and thus can directly transmit to and receive power from the engine E. Therefore, the engine E can be started by the second auxiliary motor AM2, and the second auxiliary motor AM2 may generate electric energy by power of the engine E.

The power of the engine E and the second auxiliary motor AM2 may be transferred to the driving motor M and the transmission TM through the engine clutch EC. Power of a driving motor M may be directly transferred to an input shaft of a transmission TM, and a shifted power by the TM is distributed to both driving wheels W through a differential so as to drive a vehicle.

Figure 3:
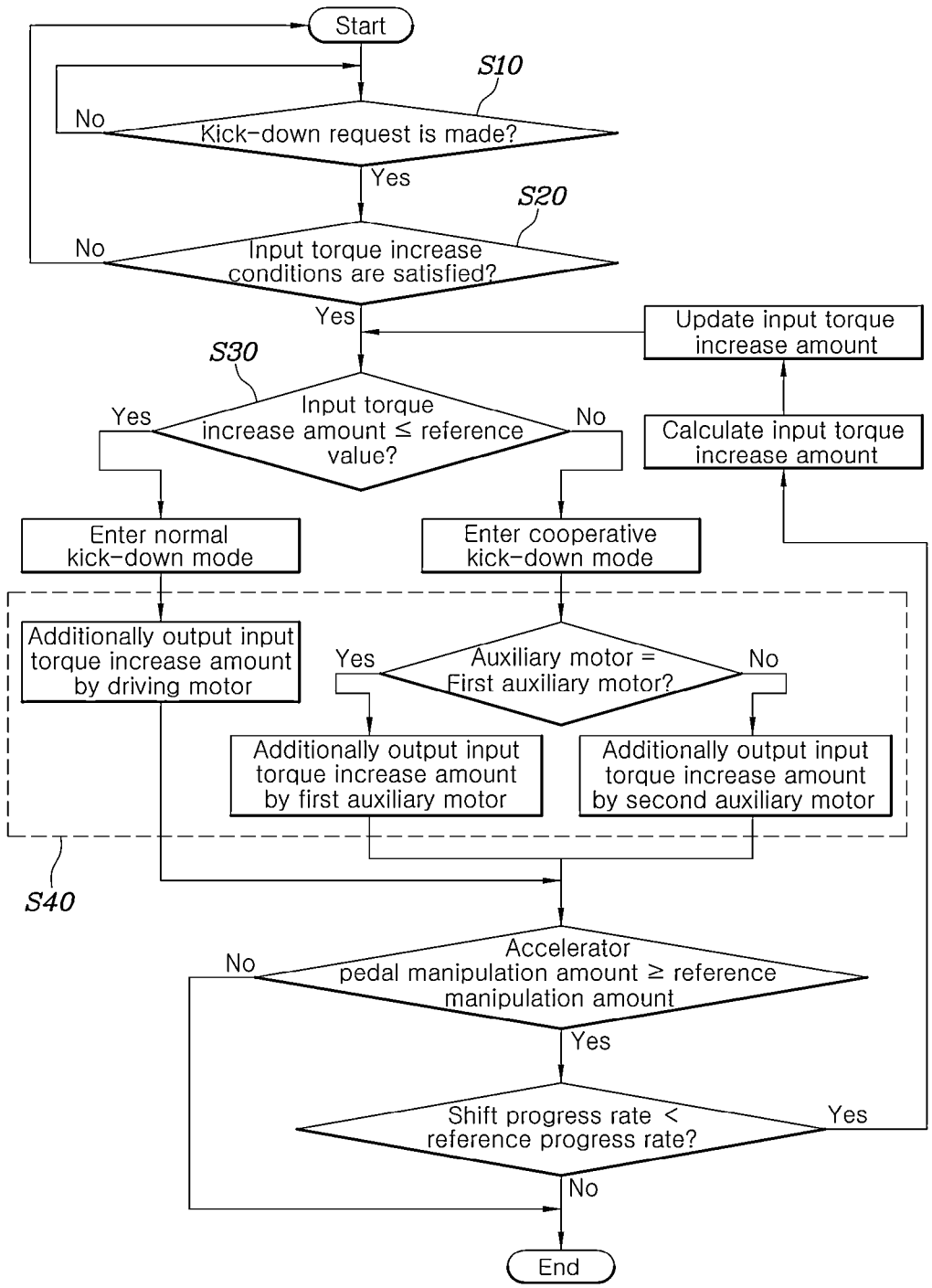
FIG. 3 is a flowchart illustrating a shift control method for a hybrid vehicle according to one embodiment of the present disclosure.

Referring to FIG. 3, as another embodiment of the present disclosure, a shift control method for a hybrid vehicle includes: a step S10 of determining whether a request for a kick-down shift has been made; a step S20 of identifying predetermined input torque increase conditions when the kick-down shift request is made; a step S30 of comparing a predetermined input torque increase amount with a predetermined reference value when all of the input torque increase conditions are satisfied; and a step S40 of controlling a driving motor M or an auxiliary motor to additionally output the input torque increase amount, based on the result of comparing the input torque increase amount with the reference value.

That is, in the present embodiment, when a request for a kick-down shift is made by manipulating an accelerator pedal by a driver, the input torque increase conditions may be identified; when the input torque increase conditions are satisfied, the driving motor M or the auxiliary motor may be controlled to additionally output the input torque increase amount, and thereby provide additional torque to the driving wheels W at the time of the kick-down shift. Thus, the acceleration of the vehicle corresponding to the driver's request may be achieved, and ultimately, the merchantability of the vehicle may be improved.

In the step S10 of determining the kick-down shift request has been made, it may be determined that the kick-down shift request has been made when the amount of accelerator pedal manipulation by a driver is equal to or greater than a predetermined level.

It may be determined that the input torque increase conditions are satisfied when: the state of charge (SOC) of a high-voltage battery installed in a vehicle is equal to or greater than a predetermined reference SOC, and the allowable power of the high-voltage battery is equal to or greater than predetermined reference power; a driver demand torque calculated based on the amount of accelerator pedal manipulation by the driver is less than a predetermined maximum torque; and an engine clutch EC is in an engaged state within a predetermined slip rate.

In other words, all of the input torque increase conditions may be considered to be satisfied when: the SOC of the high-voltage battery is equal to or greater than the reference SOC and thus corresponds to a level at which the input torque increase amount can be additionally output; allowable power, which can be currently output from the high-voltage, is equal to or greater than the reference power and thus corresponds to a level at which the input torque increase amount can be additionally output; the driver demand torque is less than the maximum torque and thus is not so excessive that the same cannot be provided by the powertrain; and the slip rate of the engine clutch EC is within the reference slip rate and thus the engine clutch EC is completely or almost fastened so that power from the engine E and the auxiliary motor can be smoothly transmitted to the transmission TM.

Therefore, the reference SOC, the reference power, the maximum torque, and the reference slip rate may be determined on a design basis by multiple experiments and analyses according to the above-described purpose. For example, the reference SOC may be configured to be 60%, the reference power may be configured to be 100 KW, the maximum torque may be configured to be 500N, or the reference slip rate may be configured to be 10%.

Further, the input torque increase conditions may include determining whether a combination of a current shift stage and a target shift stage corresponds to a predetermined shift combination.

This is for the purpose of preventing the input torque increase, although the amount of accelerator pedal manipulation by the driver is equal to or greater than the level of the kick-down shift request, when the current shift stage of a vehicle is an excessive low shift state or when an increase in input torque is not needed for shift.

Her, the shift combination may be a combination of shift stages in which the input torque increase is needed, which are previously determined by performing multiple experiments and analyses. If the drivers' request for a kick-down shift is made, a shift combination may be considered to be satisfied as a condition added to the input torque increase conditions only when a combination of a current shift stage and a calculated target shift stage corresponds to the shift combination.

The input torque increase amount is calculated as the difference between a driver demand torque and a vehicle output torque.

The driver demand torque is calculated based on the amount of accelerator pedal manipulation by the driver. The vehicle output torque is calculated by summing an output torque of the engine E, an output torque of the driving motor M, and an output torque of the auxiliary motor.

In detail, the driver demand torque may be calculated by using a map or the like predetermined based on the amount of accelerator pedal manipulation by the driver, and the vehicle output torque may be substantially the sum of current output torques of the engine E, the driving motor M, and the auxiliary motor AM1 or AM2, and may be calculated by obtaining information about torques that are currently and substantially output from an engine controller, a driving motor controller, and an auxiliary motor controller and adding the torques.

For reference, although the engine controller, the driving motor controller, and the auxiliary motor controller receive orders of out torques from a vehicle controller on the basis of the driver demand torque, the engine controller, the driving motor controller, and the auxiliary motor controller may not output the ordered torques in full extent for various reasons and may limit the respective output torques. Therefore, substantial vehicle output torque may not satisfy the driver demand torque.

The reference value is determined based on allowable surplus torque of the driving motor M.

In one embodiment, the allowable surplus torque may be obtained by subtracting a torque currently output by the driving motor M from a maximum torque that can be output by the driving motor M. Therefore, the reference value is configured to be equal to the allowable surplus torque or is configured by adding a surplus value to the allowable surplus torque. Ultimately, whether the input torque increase amount can be handled by only the driving motor M handles is determined by comparing the input torque increase amount with the reference value.

When the input torque increase amount is equal to or less than the reference value, the driving motor M may additionally output the input torque increase amount, and thus the input torque increase amount may be output by the driving motor M.

When the input torque increase amount is greater than the reference value, the input torque increase amount may be output by the auxiliary motor.

The auxiliary motor may be the first auxiliary motor AM1 or the second auxiliary motor AM2. When a vehicle has the first auxiliary motor AM1 as the auxiliary motor in a powertrain, the vehicle may use the first auxiliary motor AM1 to output the input torque increase amount. If the vehicle is provided with the second auxiliary motor AM2 as the auxiliary motor in a powertrain, the vehicle may allow the second auxiliary motor AM2 to output the input torque increase amount.

A step of controlling the driving motor M or the auxiliary motor to output the input torque increase amount may be repeatedly performed while updating the input torque increase amount when the amount of accelerator pedal manipulation by the driver is equal to or greater than a predetermined reference manipulation amount and when a shift progress rate is less than a predetermined reference progress rate.

In other words, while the driver may continuously depress an accelerator pedal at a predetermined level or higher with intention of acceleration, and until a shift is almost completed, the input torque increase amount may be continuously updated. Thus, the driving motor M or the auxiliary motor may continuously output the updated input torque increase amount while being optimized for a vehicle state change. Therefore, it is possible to substantially enhance the feeling of acceleration of a vehicle while ensuring a shift quality.

The reference manipulation amount may be determined at a level at which the driver's intension of continuous acceleration can be determined. The reference progress rate may be determined at a level at which whether a shift has been almost completed can be determined.

For reference, the present disclosure as described above may be performed by the vehicle controller, which is a high-level controller of the engine controller, the driving motor controller, and the auxiliary motor controller, or may be performed by a separate controller. The controller (CLR) is briefly illustrated in FIGS. 1 and 2.

Although the present disclosure has been described and illustrated in conjunction with particular embodiments thereof, it should be apparent to those having ordinary skill in the art that various improvements and modifications may be made to the present disclosure without departing from the technical idea of the present disclosure.

What is claimed is:

1. A shift control method for a hybrid vehicle, the shift control method comprising:
   determining whether a request for a kick-down shift has been made;
   identifying predetermined input torque increase conditions when the kick-down shift request is made;
   comparing a predetermined input torque increase amount with a predetermined reference value when all of the predetermined input torque increase conditions are satisfied; and
   controlling a driving motor or an auxiliary motor of the hybrid vehicle to additionally output the predetermined input torque increase amount, based on a result of comparing the predetermined input torque increase amount with the predetermined reference value,
   wherein the controlling of the driving motor or the auxiliary motor to output the predetermined input torque increase amount is repeatedly performed while updating the predetermined input torque increase amount when the amount of accelerator pedal manipulation by a driver is equal to or greater than a predetermined reference manipulation amount and when a shift progress rate is less than a predetermined reference progress rate.

2. The shift control method of claim 1, wherein the predetermined input torque increase conditions are determined to be satisfied when: a state of charge (SOC) of a high-voltage battery installed in the hybrid vehicle is equal to or greater than a predetermined reference SOC, and allowable power of the high-voltage battery is equal to or greater than predetermined reference power; a driver demand torque calculated based on an amount of accelerator pedal manipulation by a driver is less than a predetermined maximum torque; and an engine clutch is in an engaged state within a predetermined slip rate.

3. The shift control method of claim 2, wherein the predetermined input torque increase conditions are further satisfied when a combination of a current shift stage and a target shift stage corresponds to a predetermined shift combination.

4. The shift control method of claim 1, wherein the predetermined input torque increase amount is calculated as a difference between a driver demand torque and a vehicle output torque.

5. The shift control method of claim 4, wherein the predetermined reference value is determined based on an allowable surplus torque of the driving motor.

6. The shift control method of claim 5, wherein, when the predetermined input torque increase amount is equal to or less than the predetermined reference value, the predetermined input torque increase amount is output by the driving motor.

7. The shift control method of claim 5, wherein, when the predetermined input torque increase amount is greater than the predetermined reference value, the predetermined input torque increase amount is output by the auxiliary motor.

8. The shift control method of claim 4, wherein the driver demand torque is calculated based on the amount of accelerator pedal manipulation by a driver, and
   the vehicle output torque is calculated by summing an output torque of an engine, an output torque of the driving motor, and an output torque of the auxiliary motor.

* * * * *